(12) United States Patent  (10) Patent No.: US 7,717,761 B2
Lindsey  (45) Date of Patent: May 18, 2010

(54) HULL FOR AN AMPHIBIOUS VEHICLE

(75) Inventor: Kevin Albert Lindsey, West Bridgford (GB)

(73) Assignee: Gibbs Technologies Ltd, Warwickshire (GB)

( * ) Notice: Subject to any disclaimer, the term of this patent is extended or adjusted under 35 U.S.C. 154(b) by 298 days.

(21) Appl. No.: 10/557,291

(22) PCT Filed: May 19, 2004

(86) PCT No.: PCT/GB2004/002156

§ 371 (c)(1),
(2), (4) Date: Nov. 18, 2005

(87) PCT Pub. No.: WO2004/103743

PCT Pub. Date: Dec. 2, 2004

(65) Prior Publication Data

US 2007/0006788 A1  Jan. 11, 2007

(30) Foreign Application Priority Data

May 19, 2003 (GB) .................................. 0311499.8

(51) Int. Cl.
*B60F 3/00* (2006.01)
*B63H 19/08* (2006.01)
(52) U.S. Cl. .................................. 440/12.51; 440/12.5
(58) Field of Classification Search ................ 440/12.5, 440/12.51–12.54
See application file for complete search history.

(56) References Cited

U.S. PATENT DOCUMENTS

| | | | |
|---|---|---|---|
| 3,241,472 A | 3/1966 | Robertson | |
| 3,280,785 A | 10/1966 | Mycroft | |
| 3,463,108 A * | 8/1969 | Neumeier | .................. 114/313 |
| 3,903,831 A | 9/1975 | Barlett et al. | |
| 4,161,796 A * | 7/1979 | Kostanecki | .................. 114/357 |
| 4,241,686 A | 12/1980 | Westphalen | |
| 4,958,584 A * | 9/1990 | Williamson | ............... 440/12.52 |
| 5,417,177 A | 5/1995 | Taguchi et al. | |
| 5,520,138 A | 5/1996 | Humphrey | |
| 5,531,179 A * | 7/1996 | Roycroft et al. | ............ 440/12.5 |
| 5,562,066 A | 10/1996 | Gere | |

(Continued)

FOREIGN PATENT DOCUMENTS

EP  0742761  8/1995

(Continued)

*Primary Examiner*—Daniel V Venne
(74) *Attorney, Agent, or Firm*—Fulwider Patton LLP

(57) ABSTRACT

The planing surface of amphibious vehicle hull (2), with reference to (FIG. 2), comprises at least one discontinuity, e.g. wheel arch recesses (12) to (15). The wheels may be retractable. Access is required to the full arch aperture during vehicle manufacture, but not in use. To maximize the planing area, planing plates (9, 11) are provided. These are fixed in position in both land and marine modes; but may be removable for maintenance. At least one plate may comprise at least part of a strake (22, 25) attached to, or incorporated in, its underside. Such strake section(s) may be sacrificial, and may be made from rubber. A trim tab (30, FIG. 9), may be provided aft of a rear planing plate, and may be hinged thereto. The plates may include water drains and jacking apertures. A ride plate (38, FIG. 1) may be provided between two planing plates, and may be integral therewith.

20 Claims, 8 Drawing Sheets

U.S. PATENT DOCUMENTS

| | | | |
|---|---|---|---|
| 5,690,046 A | 11/1997 | Grzech | |
| 5,765,497 A | 6/1998 | Thomas et al. | |
| 5,813,359 A * | 9/1998 | Hall | 114/344 |
| 6,540,569 B1 | 4/2003 | Gong | |
| 6,808,430 B1 * | 10/2004 | March | 440/12.52 |
| 6,910,928 B2 * | 6/2005 | Pease | 440/12.5 |
| 2003/0236037 A1 | 12/2003 | Matthews | |
| 2005/0239351 A1 * | 10/2005 | Darby et al. | 440/12.51 |

FOREIGN PATENT DOCUMENTS

| | | |
|---|---|---|
| SU | 839744 | 6/1981 |
| WO | WO 95/23074 | 8/1995 |

\* cited by examiner

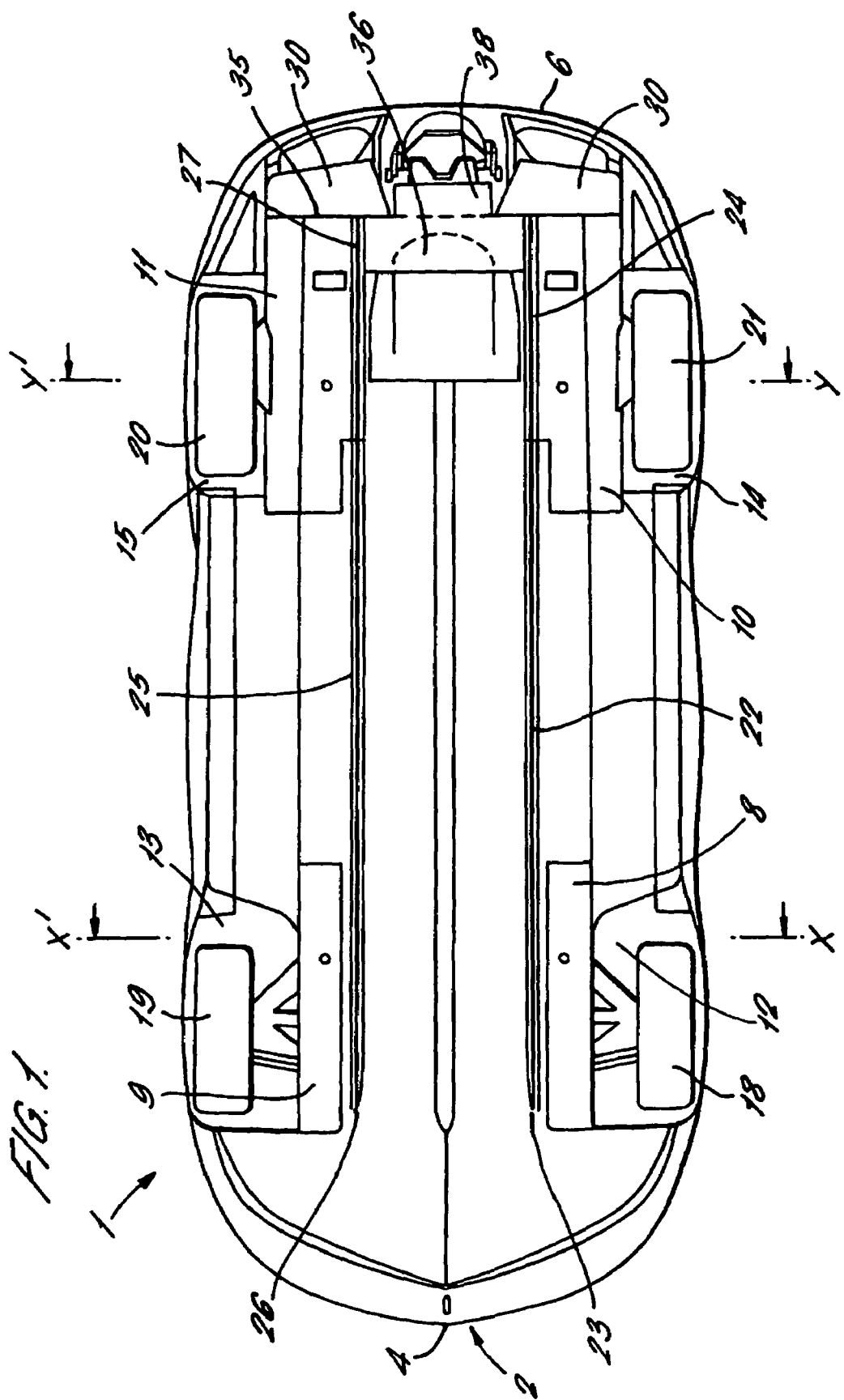

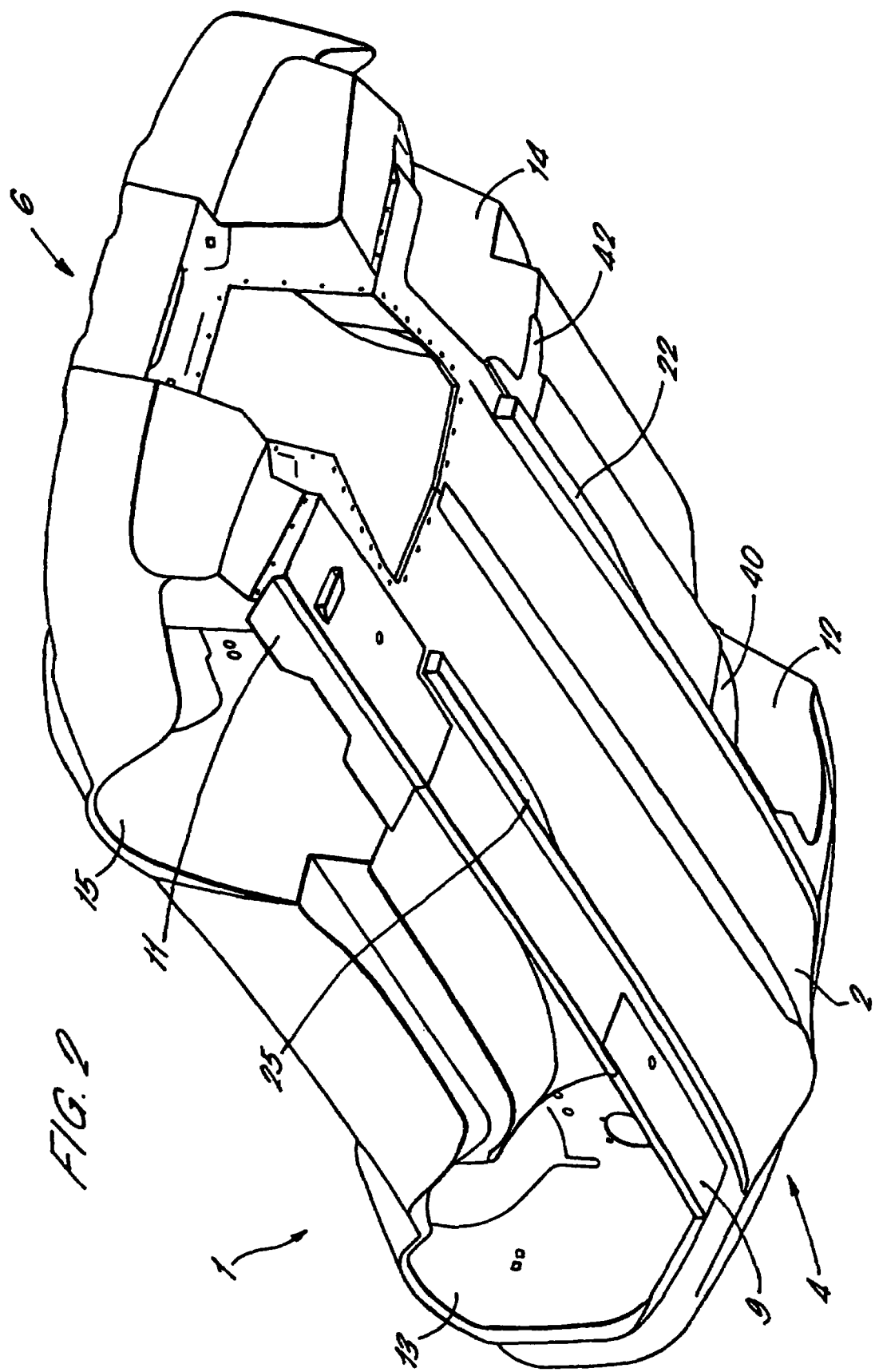

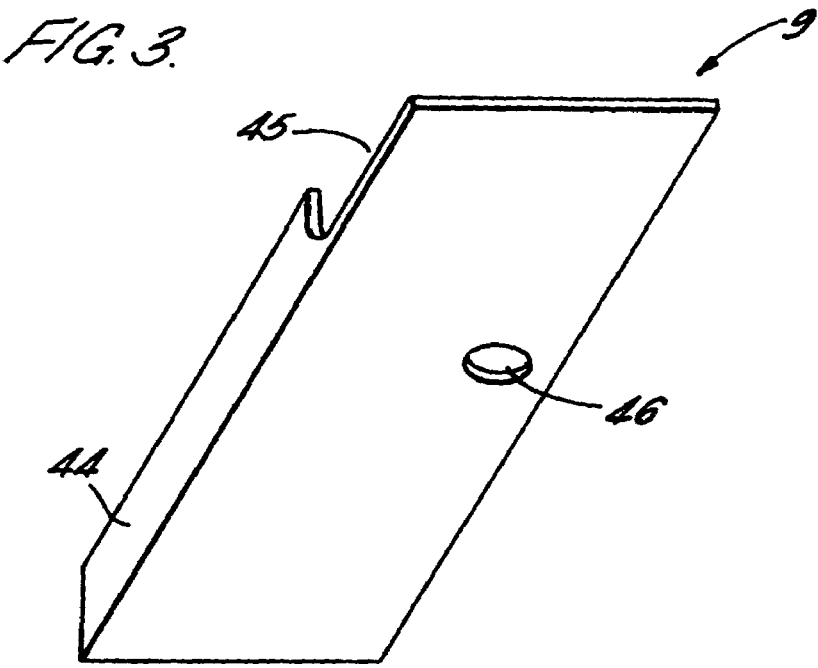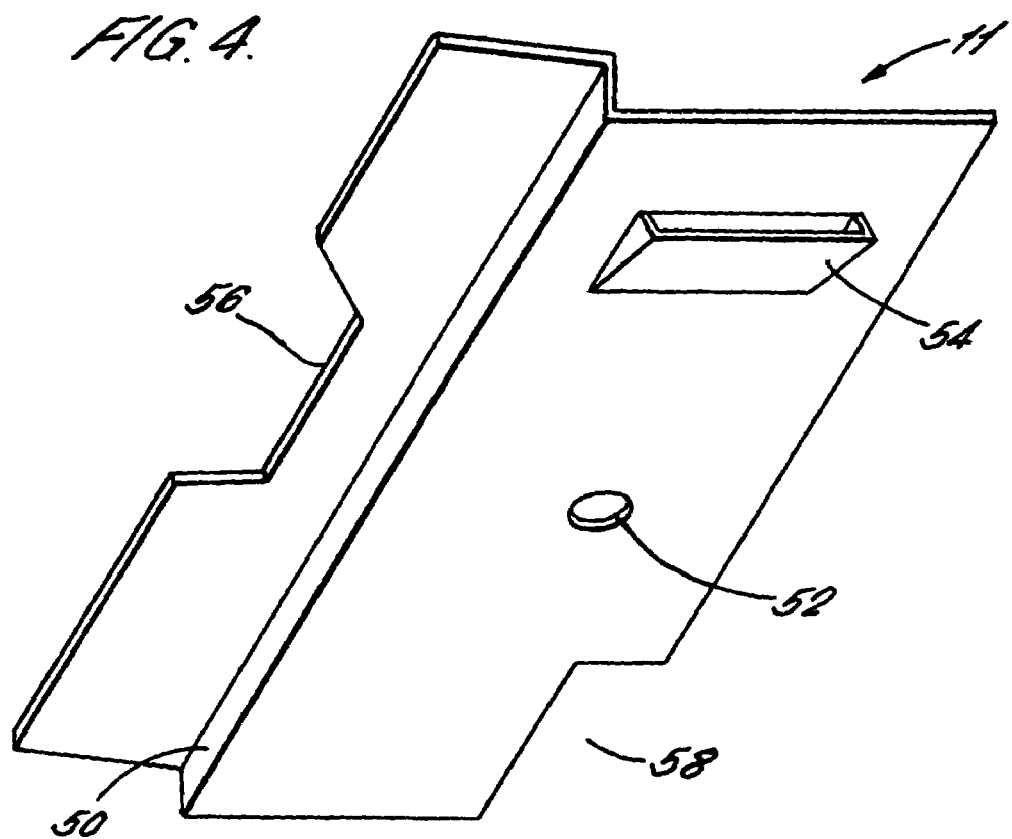

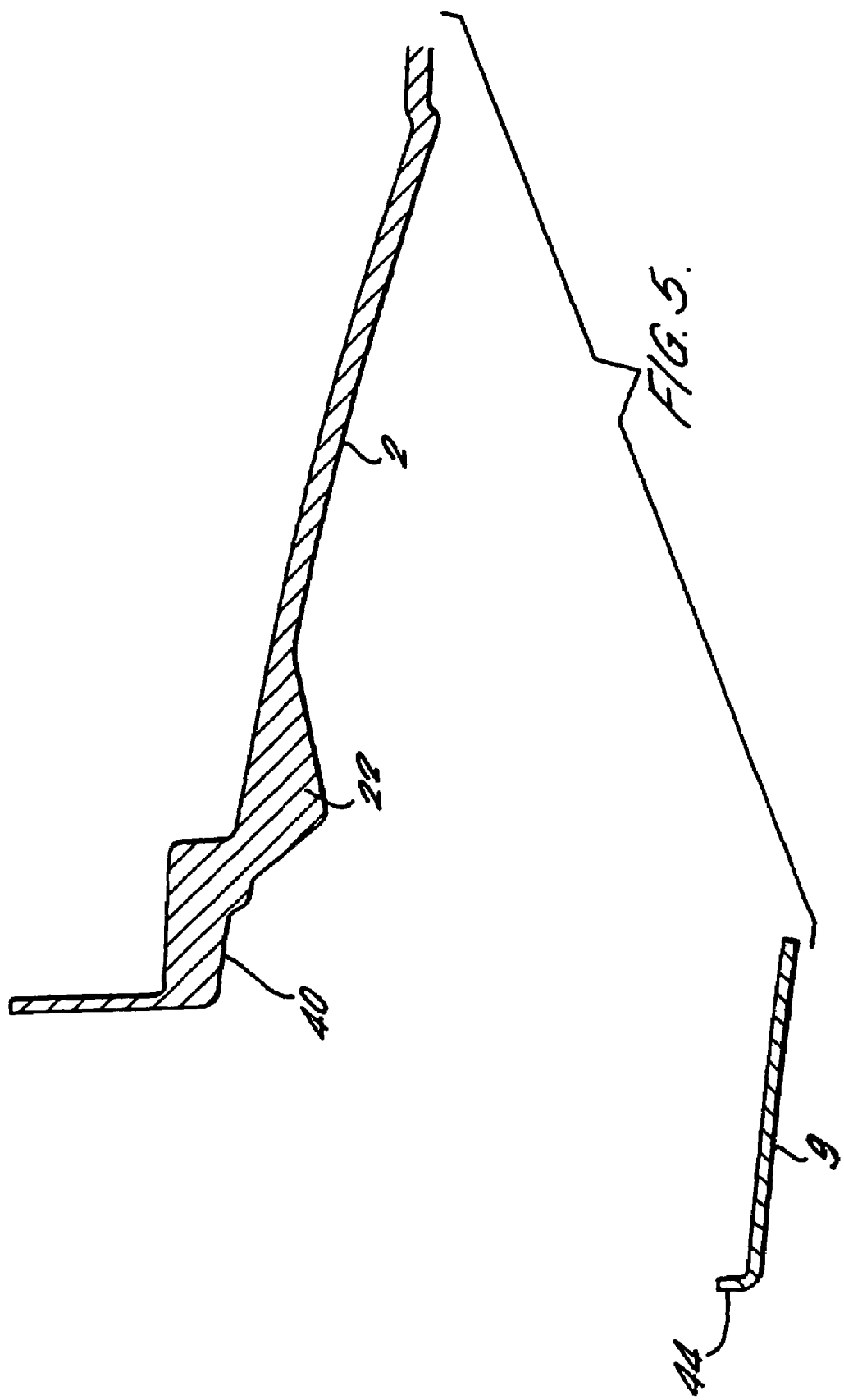

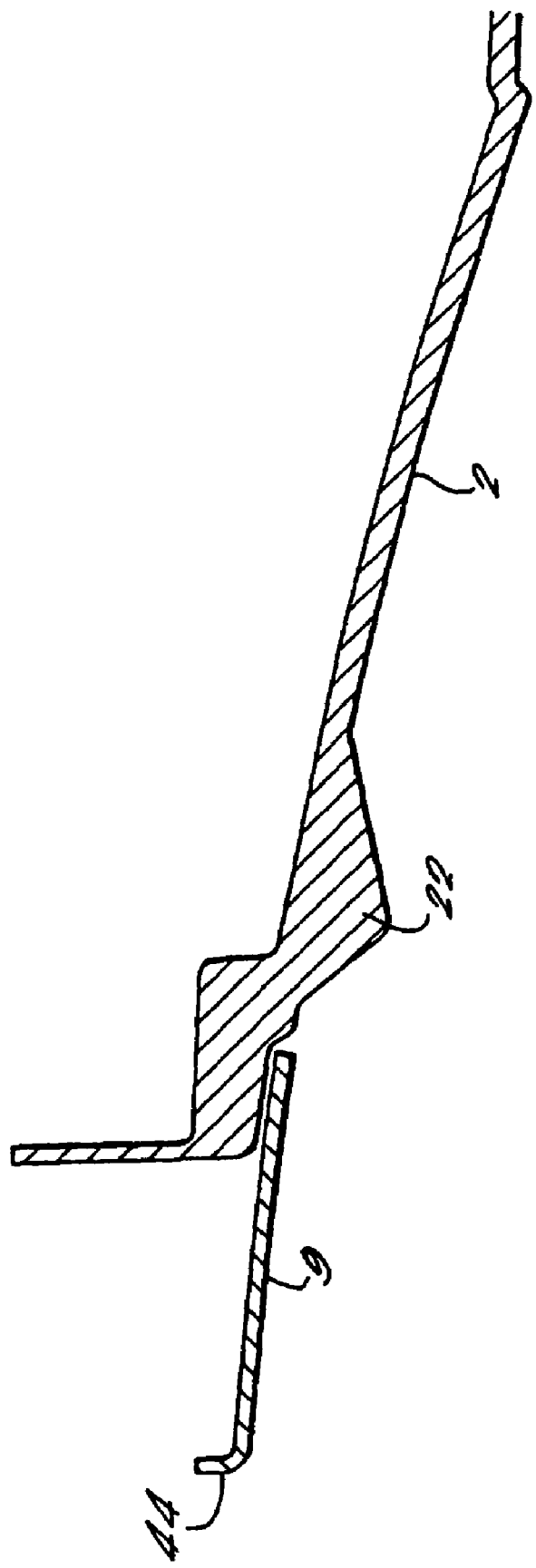

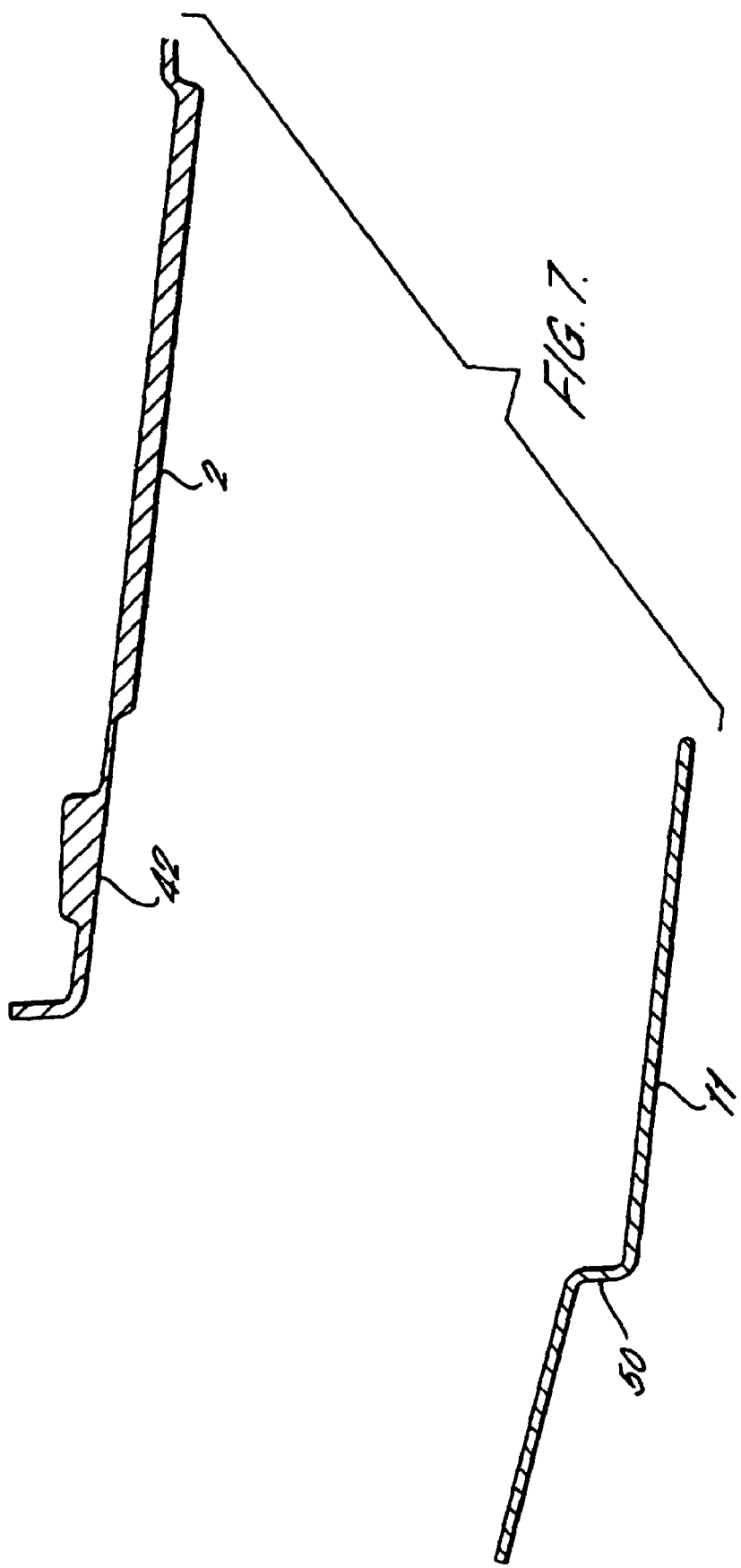

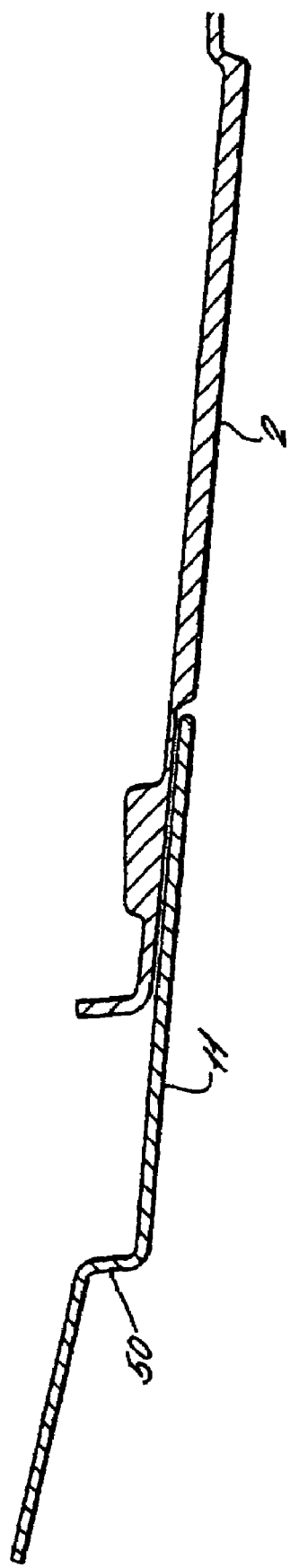

HULL FOR AN AMPHIBIOUS VEHICLE

RELATED APPLICATIONS

This application is a U.S. national phase of PCT/GB2004/002156, filed May 19, 2004, which claims priority from Great Britain Application Serial No. 0311499.8, filed May 19, 2003.

The present invention relates to a hull and, in particular, to a hull for an amphibious vehicle.

To enable an amphibious vehicle to attain greater speed on water it is desirable for the amphibious vehicle to be provided with a planing hull. Such a hull can be powered from standing where it is fully displaced to a speed where it can generate sufficient hydrodynamic lift to rise up out of the water and plane across the surface of the water.

Generally, for optimal performance, the surface of a planing hull should contain as few discontinuities as possible, as disruptions to the surface of the hull will increase drag and compromise both the hydrodynamic lift achievable, and the vehicle's handling on water. However, the nature of an amphibious vehicle is such that it can require the surface of the hull to contain discontinuities, such as recesses within which components, for example wheel assemblies, are located.

In the past, designers of amphibious vehicles have focussed their efforts on optimising either on-water or on-land performance. As a result, either on-water performance has been sacrificed in order to give satisfactory on-land performance, or on-land performance sacrificed to give satisfactory on-water performance. When attempting to optimise on-water performance, for example, designers of amphibious vehicles with retractable wheel suspensions have expended great effort in providing movable cover mechanisms for wheel arch cut outs to re-establish the smooth uninterrupted lines of a conventional marine hull when the wheels are retracted. Alternatively, wheel arch cut outs have been omitted completely. In this case, road wheels have been kept outboard of the hull in both the protracted or lowered (on-land) condition, and the retracted or raised (on-water) condition.

Conversely, the present applicant has preferred to design an amphibious vehicle having optimised on-land and on-water performance. To this end, the applicant has gone against conventional thinking and overcome previous technical prejudices in arriving at the hull configuration according to the present invention.

Firstly, the applicant has found it desirable for the hull of an amphibious vehicle to have shallow deadrise angles (a maximum of 6 degrees over the planing area of the hull) as compared to that of a conventional planing hull (10 to 25 degrees). This enables sufficient ground clearance when on land without compromising handling and performance of the vehicle in land mode by having to raise mechanical components and occupant seating to suit conventional deadrise angles. This would increase frontal area, and thus aerodynamic drag; and also raise the centre of gravity, thus increasing cornering roll and decreasing passenger comfort. The adoption of low dead rise angles is contrary to what has been previously accepted as being necessary for a planing marine hull.

Secondly, the applicant has retained wheel arch cut outs in the hull but optimised the configuration by incorporating planing plates. These planing plates are essentially rigid, and are fixed in position. The advantage of rigid plates over flexible plates is that they do not significantly change shape in use; so that the hydrodynamic performance and handling of the hull is predictable. Flexible plates are also liable to damage in road use, or when driving between road and water; as they have movable edges which may deflect into harm's way, particularly when reversing.

Movable plates are known in amphibious vehicles for example from U.S. Pat. No. 4,958,584 (Williamson), U.S. Pat. No. 3,421,472 (Oberg), and U.S. Pat. No. 3,280,785 (Oberg). Although a fixed planing plate has the clear theoretical drawback of covering a smaller area than a movable plate, it has considerable practical advantages. The sliding and/or hinging mechanisms of movable plates are liable to seize up through corrosion, and/or through ingress of sand, silt, salt, or other marine debris. They may also be damaged through collision with objects such as rocks during vehicle mode conversion. An amphibious vehicle which cannot change mode may be immobilized; either on land, or even worse, on water. Furthermore, the necessity of maintaining and scrupulously cleaning sliding and/or hinging mechanisms may not likely be acceptable to the vehicle owner, who will be accustomed to the less onerous demands of modern cars and boats. Although movable cover plates have been proposed in several amphibious vehicle patents as noted above, the applicant is not aware of any examples in series production, in the present or past. It is thus ventured that these prior art mechanisms fail for the reasons set out above.

Through the adoption of essentially rigid and fixed planing plates, the present applicant has been able to optimise on-land vehicle handling and performance at the expense of reduced dead rise angles; but without compromising the planing ability of the hull. This has resulted in an amphibious vehicle which can still achieve sufficient through water speed and hydrodynamic lift to get the vehicle up on to the plane. As such, on-water performance is not compromised.

Accordingly the present invention provides a hull for an amphibious vehicle operable in land and marine modes, the hull comprising:

a planing surface;

at least one discontinuity in the planing surface; and at least one planing plate which at least in part covers the discontinuity in the planing surface, wherein:

the at least one planing plate is fixedly located in place on the hull and remains in a single fixed location throughout operation of the vehicle in land and marine modes and, by providing itself a planing surface, gives rise to an increase in the total area of the planing surface of the hull.

Preferably, the at least one discontinuity comprises at least a first pair of discontinuities in the planing surface, and the at least one planing plate comprises at least a first pair of planing plates which at least in part cover the respective first pair of discontinuities in the planing surface.

Preferably, the planing plates of the said pair of planing plates are located on either side of a keel provided centrally on the underside of the hull, the planing plates being spaced equidistantly from the keel.

Preferably, the at least one discontinuity comprises at least a first pair of discontinuities in the planing surface, the hull comprises at least a second pair of discontinuities in the hull surface, and the at least one planing plate comprises at least a first pair of planing plates which at least in part cover the respective first pair of discontinuities in the planing surface and a second pair of planing plates which at least in part cover the respective second pair of discontinuities in the hull surface.

Preferably, the planing plates of the said second pair of planing plates are located on either side of a keel provided centrally on the underside of the hull, the planing plates being spaced equidistantly from the keel.

Preferably, the at least one discontinuity comprises a recess provided in the hull to accommodate a wheel assembly.

Preferably, the wheel assembly is retractable from a first deployed condition for use of the vehicle in the land mode to a second stowed condition for use of the vehicle in the marine mode.

Preferably, the wheel assembly remains clear of the at least one planing plate in the first deployed condition, the second stowed condition, and in the transition therebetween.

Preferably, the at least one planing plate is removable for assembly and disassembly purposes only. Alternatively, the at least one planing plate is formed integrally with the hull.

Preferably, the at least one planing plate further comprises at least a portion of a strake attached to, or incorporated in, its underside. More preferably, the at least one portion of strake is a sacrificial element designed to wear. Preferably, the at least one portion of strake is formed from rubber and attached to the at least one planing plate.

Preferably, the hull further comprises at least one trim tab provided downstream of the at least one planing plate and having a control surface, wherein water passing under the at least one planing plate exits via the trim tab and can be acted on by the control surface of the trim tab to trim the vehicle when in the marine mode. Preferably, the control surface of the at least one trim tab is hingedly attached to the at least one planing plate.

Preferred embodiments of the present invention will now be described by way of example only with reference to the accompanying drawings, in which:

FIG. 1 is a plan view of an underside of a hull according to the present invention;

FIG. 2 is a perspective view from below of the hull of FIG. 1 illustrating front and rear planing plates in position on the port side of the hull;

FIG. 3 is a perspective view from below of the front port side planing plate according to the present invention;

FIG. 4 is a perspective view from below of the rear port side planing plate according to the present invention;

FIG. 5 is an exploded cross sectional view through the front port side planing plate and adjoining section of hull of FIG. 1, taken along the line x-x';

FIG. 6 is a cross sectional view through the front port side planing plate when attached to the hull of FIG. 1, taken along the line x-x';

FIG. 7 is an exploded cross sectional view through the rear port side planing plate and adjoining section of hull of FIG. 1, taken along the line y-y';

FIG. 8 is a cross sectional view through the rear port side planing plate when attached to the hull of FIG. 1, taken along the line y-y'.

Figure 9:
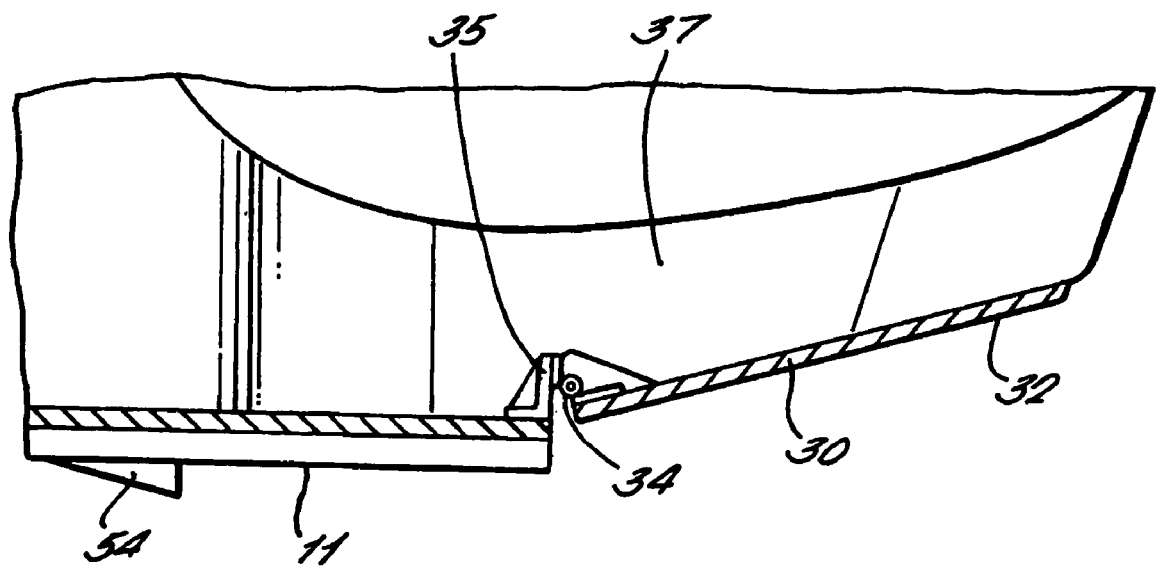
FIG. 9 is a side view of a rear port side trim tab adjacent to the rear port side planing plate when attached to the hull of FIG. 1, looking at the side of the vehicle behind the rear wheel.

FIG. 1 shows an amphibious vehicle 1 having a hull 2 comprising a forward bow end 4 and a rearward stern end 6. Provided on the underside of the hull 2 are a pair of forward planing plates 8, 9 and a pair of rearward planing plates 10, 11. The planing plates 8, 9, 10, 11 serve to increase the effective surface area of the hull 2, extending substantially horizontally and flush with the hull 2 so as to at least partially cover recesses provided in the hull for assembly purposes.

When the hull 2 achieves sufficient through water speed, the resulting hydrodynamic lift causes the hull 2 to rise out of the water and onto the plane. In this condition the forward bow end 4 of the hull 2 lifts clear of the surface of the water and only the rearward planing surface of the hull 2 remains in contact with the water, albeit on the surface only. The planing surface of the vehicle 1 is thus constituted by the hull surface at rear of the vehicle 1, typically the portion of the hull 2 extending rearwardly from a point one third of the way along the length of the vehicle 1 from bow 4 to stern 6.

In order for the vehicle 1 to make the transition from its hull 2 being fully displaced and being non-displaced, i.e. planing, the through water speed of the vehicle 1 must be increased to achieve the necessary hydrodynamic lift. All four planing plates 8, 9, 10, 11 are key in reducing the drag of the hull 2 and facilitating the necessary gain in speed of the vehicle 1. Once on the plane, the rear planing plates 10, 11 are crucial in providing an increased planing hull area to maintain the vehicle 1 on the plane in the most efficient manner.

When the vehicle 1 is planing, the forward end 4 of the hull 2 is raised such that in straight line running the forward planing plates 8, 9 are not in contact with the surface of the water. Therefore, the primary purpose of the forward planing plates 8, 9 is to increase the wetted area of the hull 2 and reduce the drag caused by the front wheel arches 12, 13 during the transitional period between the hull 2 displacing water and the hull 2 being on the plane.

Although in straight line planing travel the forward planing plates 8, 9 will not be in contact with the surface of the water, when the vehicle 1 is making a turn the roll of the vehicle 1 may bring the forward planing plates 8, 9 into contact with the water. In this situation, the forward planing plates 8, 9 help control the flow of water under the contained wheel assemblies within front wheel arches 12, 13 and increase the reaction surface of the hull, preventing the hull "digging in" so that the turn may be made with ultimate control.

FIG. 2 shows in greater detail the shape and configuration of the hull 2 and planing plates 8, 9, 10, 11. The port side of the hull 2 is shown with planing plates 9, 11 attached, and the starboard side of the hull 2 is shown without planing plates 8, 10. Recesses 40, 42 are provided in the hull 2 adjacent to wheel arches 12, 14 so that, when fitted to the hull 2, the lower surfaces of the planing plates 8, 10 are substantially flush with the surface of the hull 2. Symmetrically opposed recesses, not shown, are provided adjacent to wheel arches 13, 15 for the housing of port side planing plates 9, 11.

The shape of the planing plates 8, 9, 10, 11 corresponds with the contours of the hull 2. The planing plates 8, 9, 10, 11 are sized such that they do not interfere with the operation of the wheel assemblies 18, 19, 20, 21. The size of the forward planing plates 8, 9 is limited by the turning angle of the front wheels and the travel required by the suspension when the vehicle 1 is operating on land. The size of the rearward planing plates 10, 11 is limited by the rebound travel of the suspension and the location and articulation of the driveshafts. Accordingly, none of the planing plates 8, 9, 10, 11 are movable in use of the amphibious vehicle 1. Instead they are optimised for both on-land and on-water performance.

Shown in FIG. 1 and FIG. 2 are strakes 22, 25 which run along the hull 2 from the forward bow end 4 to the rearward stern end 6 and pass across the rearward planing plates 10, 11. The strakes 22, 25 improve directional stability of the hull when planing on water as described in the applicant's copending UK patent application no. 0311500.3 entitled 'A Hull For An Amphibious Vehicle'. To enable the rearward planing plates 10, 11 to be attached to the hull 2, the strakes 22, 25 are formed in two portions, with the rearward portions 24, 27 being removably attachable directly or indirectly to the hull 2 independently from the forward portions 23, 26. As the forward portions 23, 26 of the strakes 22, 25 do not pass over the forward planing plates 8, 9, preferably they are moulded integrally with the hull 2. The rearward strake portions 24, 27 are attached to the rear planing plates 10, 11 respectively, which are in turn attached to the hull 2 as described above. Preferably, the rearward strake portions 24, 27 are formed from a rubber or other compliant material since they are most likely to be subject to impacts or wear. Indeed, the rearward strake portions 24, 27 may be sacrificial elements which are designed to be serviceable items. The rearward strake portions 24, 27 may be attached to the rear planing plates 10, 11 by any suitable fastening means, e.g. using mechanical fasteners or adhesive or both. Alternatively, the rearward strake portions 24, 27 may be formed integrally with the rear planing plates 10, 11.

FIGS. 3 and 4 show detail views of the port side forward 9 and rear 11 planing plates respectively, seen from below and behind. The starboard side front and rear planing plates 8, 10 are identical, but in mirror image thereto. The planing plates 8, 9, 10, 11 are preferably formed from pressed aluminium sheet although it is envisaged that the plates 8, 9, 10, 11 may be manufactured from any suitable material, be it a metal, a metal alloy, a polymer or a composite material.

The forward planing plates 8, 9 are substantially planar and include a flange 44 to increase the plate stiffness and a jacking hole 46 to provide access through the plate 8, 9 to a jacking point on the hull, not shown. Preferably, a cut away 45 in the flange 44 serves as a drain for water to escape from the upper side of the planar region of the plate 8, 9.

The rearward planing plates 10, 11 comprise a step 50 to correspond with a step change in the hull 2, a jacking hole 52, a water drain 54 to facilitate drainage of water from the upper planar side of the plates 10, 11 and a recess 56 to accommodate suspension rebound travel. The rearward planing plates 10, 11 are also provided with a cutout 58 to enable the plate to be fixed around a strake 22, 25 moulded in the hull, as shown in FIGS. 1 and 2.

Shown in cross section in FIGS. 5 and 6 is the recess 40 provided in the hull 2 for location of the forward planing plate 8. FIG. 6 shows how the lower surface of the forward planing plate 9 is substantially flush with the surface of the hull 2 when located in position on the hull 2 within the recess 40.

Similarly, FIGS. 7 and 8 show in cross section the recess 42 provided in the hull 2 for location of the rearward planing plate 10. FIG. 8 shows how the lower surface of the rearward planing plate 11 is also substantially flush with the surface of the hull when it is located within the recess 42.

The forward and rearward planing plates 8, 9, 10, 11 are preferably bonded to the hull 2 using the adhesive Plexus (RTM) MA425. The adhesive bonds are made so that the planing plates 8, 9, 10, 11 may be removed from the hull 2 to allow access for servicing and/or maintenance of the vehicle and then may be reattached to allow subsequent operation of the vehicle 1.

Optionally provided to the rear of, but adjacent to, each rearward planing plate 10, 11 is a trim tab 30, as shown in FIGS. 1 and 9. The trim tab 30 comprises a control surface 32, a hinge 34 and an electric actuator, not shown, which acts on the upper side of the trim tab 30, opposite to the control surface 32, to control the degree of actuation of the trim tab 30 around the hinge 34. The hinge is bolted to transom 35, shown in a cut away section. Area 37 is a spray control channel, as described in the applicant's co-pending application no. GB0302428.8.

Flow exiting the rear of the rearward planing plate 10, 11 acts directly on the control surface 32 of the trim tab 30. As there is a smooth transition between the rearward planing plate 10, 11 and the trim tab 30, substantially laminar flow of the water surface is experienced, maximising the efficiency and effectiveness of the trim tab 30 when trimming the vehicle in marine mode.

It should be noted also that a further beneficial result of employing the planing plates 8, 9, 10, 11 is a decrease in the spray produced by the hull 2.

Furthermore, as the planing plates 8, 9, 10, 11 help to reduce the ingress of water into the wheel arches, hydraulic attrition of suspension components is reduced.

In a further embodiment of the present invention it is envisaged that the planing plates 8, 9, 10, 11 may be attached to the hull by means other than adhesive bonding, for example by mechanical fastenings.

In a further embodiment of the present invention it is envisaged that the rearward portions 24, 27 of the strakes 23, 25 may be formed integrally with the rearward planing plates 10, 11.

It is also envisaged that rather than providing a pair of rearward planing plates 10, 11, a single all encompassing cover plate may be beneficially employed. For example, such a plate may extend across the entire beam of the underside of the hull (in the form of a jacket) and be fixed in place. This additionally provides a protective skin for the underlying hull 2, which is preferably formed of glass reinforced plastic (GRP). Furthermore, such a plate may be directly affixed to the housing of a jet drive intake (e.g. by bolting or other mechanical fastening) for strength; and provided with a bead of adhesive around its periphery, to prevent flapping of the plate relative to the underlying hull 2. A suitable aperture or apertures may be provided in the plate in the area of jet drive intake such that the plate also acts as a screen against the intake of unwanted debris or foreign objects into the jet drive itself. Alternatively, a separate jet intake stone guard may be fitted, as is known in the art.

Furthermore, although the planing plates have been described in the preferred embodiment above as separate parts bonded onto the hull, it will be appreciated by the skilled person in the art that at the expense of a more complex hull moulding and inferior access during vehicle build and maintenance, one or more of the planing plates could be made or formed integrally with the hull.

A yet further option is for a ride plate to be fitted as shown at 38 in FIG. 1. Such a plate extends the planing area aft of transom 35 beneath the jet drive. It may also extend the planing area as shown at 36 over the rear part of the jet intake. This may appear to restrict the jet intake area; but as the water flow is angled upwards, the constriction perpendicular to the direction of flow is not as great as it appears in this figure. Nonetheless, the ride plate 38 may be cut away to leave the intake clear. Such a ride plate 38 may be incorporated into the full width cover plate described above.

The invention claimed is:

1. A hull for an amphibious vehicle operable in land and marine modes, comprising:
   a planing surface;
   a first pair of discontinuities in the planing surface;
   a second pair of discontinuities in the planing surface;
   a first pair of substantially horizontal planing plates which at least in part cover the respective first pair of discontinuities in the planing surface; and
   a second pair of substantially horizontal planing plates which at least in part cover the respective second pair of discontinuities in the planing surface, wherein said planing plates are fixedly located in place on the hull and each remain in a fixed location throughout operation of the vehicle in land and marine modes and, by each providing itself a planing surface, gives rise to an increase in the total area of the planing surface of the hull.

2. A hull as claimed in claim 1 wherein the planing plates of the said first pair of planing plates are located on either side of a keel provided centrally on the underside of the hull, the planing plates being spaced equidistantly from the keel.

3. A hull as claimed in claim 1 wherein the planing plates of the second pair of planing plates are located on either side of a keel provided centrally on the underside of the hull, the planing plates being spaced equidistantly from the keel.

4. A hull as claimed in claim 1 wherein each of said discontinuities comprises a recess provided in the hull to accommodate a wheel assembly.

5. A hull as claimed in claim 4 wherein the wheel assembly is retractable from a first deployed condition for use of the vehicle in the land mode to a second stowed condition for use of the vehicle in the marine mode.

6. A hull as claimed in claim 5 wherein the wheel assembly remains clear of the planing plate which at least in part covers said recess while in the first deployed condition, the second stowed condition, and in the transition therebetween.

7. A hull as claimed in claim 1 wherein the planing plates are removable for assembly and disassembly purposes only.

8. A hull as claimed in claim 1 wherein at least one of said planing plates further comprises at least a portion of a strake attached to, or incorporated in, its underside.

9. A hull as claimed in claim 8 wherein the at least a portion of strake is a sacrificial element designed to wear.

10. A hull as claimed in claim 8 wherein the at least a portion of strake is formed from rubber and attached to the at least one planing plate.

11. A hull for an amphibious vehicle operable in land and marine modes, the hull comprising:
a planing surface;
at least one discontinuity in the planing surface;
at least one planing plate which at least in part covers the discontinuity in the planing surface, wherein the at least one planing plate is fixedly located in place on the hull and remains in a single fixed location throughout operation of the vehicle in land and marine modes and, by providing itself a planing surface, gives rise to an increase in the total area of the planing surface of the hull; and
at least one trim tab provided downstream of the at least one planing plate and having a control surface, wherein water passing under the at least one planing plate exits via the trim tab and can be acted on by the control surface of the trim tab to trim the vehicle when in the marine mode, wherein the control surface of the at least one trim tab is hingedly attached to the at least one planing plate.

12. A hull for an amphibious vehicle operable in land and marine modes, the hull comprising:
a planing surface;
at least one discontinuity in the planing surface;
at least one substantially horizontal planing plate which at least in part covers the discontinuity in the planing surface, wherein the at least one planing plate is fixedly located in place on the hull and remains in a single fixed location throughout operation of the vehicle in land and marine modes and, by providing itself a planing surface, gives rise to an increase in the total area of the planing surface of the hull, wherein the at least one discontinuity comprises at least a first pair of discontinuities in the planing surface; and
the at least one planing plate comprises at least a first pair of planing plates which at least in part cover the respective first pair of discontinuities in the planing surface wherein the at least one planing plate is formed integrally with the hull.

13. A hull for an amphibious vehicle operable in land and marine modes, the hull comprising:
a planing surface;
at least one discontinuity in the planing surface;
at least one substantially horizontal planing plate which at least in part covers the discontinuity in the planing surface, wherein the at least one planing plate is fixedly located in place on the hull and remains in a single fixed location throughout operation of the vehicle in land and marine modes and, by providing itself a planing surface, gives rise to an increase in the total area of the planing surface of the hull, and wherein a first pair of planing plates is provided at the rear of the vehicle and a further plate is provided between the first pair of planing plates.

14. A hull as claimed in claim 13 wherein the further plate is a ride plate which further extends the planing area.

15. A hull as claimed in claim 13 wherein the further plate is integral with the two planing plates.

16. A hull as claimed in claim 13 wherein the further plate is formed integrally with the hull.

17. A hull for an amphibious vehicle operable in land and marine modes, comprising:
a planing surface;
a first pair of discontinuities in the planing surface for extension of at least portions of wheel assemblies therethrough;
a second pair of discontinuities in the planing surface for extension of at least portions of wheel assemblies therethrough;
a first pair of substantially horizontal planing plates which at least in part cover the respective first pair of discontinuities in the planing surface; and
a second pair of substantially horizontal planing plates which at least in part cover the respective second pair of discontinuities in the planing surface, wherein said planing plates are fixedly located in place on the hull and each remain in a fixed location throughout operation of the vehicle in land and marine modes and, by each providing itself a planing surface, gives rise to an increase in the total area of the planing surface of the hull.

18. The hull of claim 17, wherein said planing plates are removable to provide full access to said wheel assemblies.

19. The hull of claim 18, wherein said planing plates are attached to said hull by mechanical fasteners.

20. The hull of claim 18, wherein said planing plates are attached to said hull by an adhesive.

* * * * *